United States Patent
Ross et al.

(10) Patent No.: US 8,577,117 B2
(45) Date of Patent: Nov. 5, 2013

(54) EVALUATING SOILING OF A MEDIA ITEM

(75) Inventors: Gary A. Ross, Midlothian (GB); Chao He, Dundee (GB)

(73) Assignee: NCR Corporation, Duluth, GA (US)

( * ) Notice: Subject to any disclaimer, the term of this patent is extended or adjusted under 35 U.S.C. 154(b) by 1313 days.

(21) Appl. No.: 12/215,868

(22) Filed: Jun. 30, 2008

(65) Prior Publication Data
US 2009/0324084 A1 Dec. 31, 2009

(51) Int. Cl.
*G06K 9/00* (2006.01)
*G06K 9/46* (2006.01)
*G06K 9/74* (2006.01)
*G06K 7/00* (2006.01)
*G01N 21/00* (2006.01)
*B07C 5/00* (2006.01)

(52) U.S. Cl.
USPC ............. 382/135; 382/173; 382/224; 356/71; 356/237.2; 194/207; 209/534

(58) Field of Classification Search
USPC ......... 382/190, 135, 173, 224; 356/71, 237.2; 209/534; 194/207
See application file for complete search history.

(56) References Cited

U.S. PATENT DOCUMENTS

| | | | | |
|---|---|---|---|---|
| 4,189,235 A | * | 2/1980 | Guter et al. | 356/239.1 |
| 4,381,447 A | * | 4/1983 | Horvath et al. | 250/223 R |
| 4,710,963 A | * | 12/1987 | Chapman et al. | 382/112 |
| 6,040,584 A | * | 3/2000 | Liu et al. | 250/559.11 |
| 6,301,373 B1 | * | 10/2001 | Bernie et al. | 382/108 |
| 6,556,693 B1 | * | 4/2003 | Dobashi et al. | 382/112 |
| 6,798,900 B1 | * | 9/2004 | Sugata | 382/137 |
| 7,103,206 B2 | * | 9/2006 | Graves et al. | 382/135 |
| 2003/0169899 A1 | * | 9/2003 | Slepyan et al. | 382/100 |
| 2005/0150740 A1 | * | 7/2005 | Finkenzeller et al. | 194/207 |
| 2005/0285325 A1 | * | 12/2005 | Mukai | 271/10.11 |
| 2006/0293783 A1 | * | 12/2006 | Hand et al. | 700/231 |
| 2008/0271973 A1 | * | 11/2008 | Bloss et al. | 194/302 |

* cited by examiner

*Primary Examiner* — Kathleen Y Dulaney
(74) *Attorney, Agent, or Firm* — Michael Chan

(57) ABSTRACT

A method and apparatus for evaluating a soiling level of a media item, such as a banknote. The method comprises receiving an image of a media item including a plurality of pixels, each pixel having an associated intensity. Two sets of pixels are created, where each pixel in the first set has a higher intensity than each pixel in the second set. A representative intensity value from the first set and a representative intensity value from the second set are calculated. A soiling value from the ratio of the representative intensity value of the second set to the representative intensity value of the first set is calculated. The media item is captured if the soiling value fulfils a capture criterion.

20 Claims, 3 Drawing Sheets

EVALUATING SOILING OF A MEDIA ITEM

FIELD OF INVENTION

The present invention relates to a method and apparatus for evaluating soiling of a media item. In particular, though not exclusively, the invention may be suitable for use in a self-service terminal environment.

BACKGROUND OF INVENTION

One particular type of self-service terminal is an automated teller machine (ATM). Traditional ATMs allow customers to withdraw banknotes from their accounts. Some advanced ATMs also allow customers to deposit banknotes, which are then recycled by the ATM and dispensed to a subsequent customer. These ATMs are sometimes referred to as currency recyclers. Currency recyclers are different to currency deposit ATMs, which merely store deposited banknotes for return to the owner of the ATM, in that a currency recycler dispenses banknotes that have been deposited by customers at that ATM.

When currency recyclers are used, a banknote may be dispensed and deposited on many occasions without ever being presented to a retail bank. Since banknotes degrade over time, currency issuing banks (typically central reserve banks) would like to remove from circulation those banknotes that are in poor condition. One aspect of poor condition is the soiling level of a banknote. It is therefore desirable for recycling ATMs to be able to ascertain the soiling level of a banknote and to remove it from circulation if it is below a certain minimum standard.

Ascertaining the soiling level of a banknote is not straightforward because the change to a banknote is not uniform for the most common types of banknote. For example, as paper banknotes (which are typically made from a cotton/paper substrate) become soiled, the dark areas of the banknote (typically intaglio printed areas) become brighter, whereas, the bright areas of the banknote (typically unprinted or watermark areas) become darker. This occurs because: (i) the fibres in the substrate (paper/cotton) break down, (ii) the ink wears off, and (iii) dirt is caught between exposed fibres. For banknotes made from a polymer substrate (polymer banknotes), the whole banknote tends to get brighter because ink wears off but there are no fibres to collect dirt.

SUMMARY OF INVENTION

Accordingly, the invention generally provides methods, systems, apparatus, and software for evaluating the soiling level of a media item.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method for evaluating a soiling level of a media item, the method comprising:

(a) receiving an image of a media item including a plurality of pixels, each pixel having an associated intensity;

(b) creating two sets of pixels, where each pixel in the first set has a higher intensity than each pixel in the second set;

(c) calculating a representative intensity value from the first set and a representative intensity value from the second set;

(d) calculating a soiling value from the ratio of the representative intensity value of the second set to the representative intensity value of the first set; and (e) capturing the media item if the soiling value fulfils a capture criterion.

The ratio of the representative intensity value of the second set to the representative intensity value of the first set may be referred to as the "evaluation ratio".

The soiling value may be the evaluation ratio, so that the capture criterion may comprise the soiling value exceeding (or optionally being equal to) a critical value. Alternatively, the soiling value may comprise the result of a mathematical function performed on the evaluation ratio using one or more pre-stored parameters, so that the capture criterion may comprise the soiling value being less than (or optionally equal to) a cut-off point. The pre-stored parameter may be unique to that type of media item, and may be stored with a template for that type of media item. Each type of media item that can be validated may have a unique pre-stored parameter.

It should be appreciated that calculating a soiling value from the ratio of the representative intensity value of the second set to the representative intensity value of the first set includes either (i) the representative intensity value of the second set divided by the representative intensity value of the first set, or (ii) the representative intensity value of the first set divided by the representative intensity value of the second set.

Capturing the media item may further comprise extracting one or more parameters from a template for that media item, and using the extracted parameter(s) as part of the capture criterion. The capture criterion may be (i) a single condition, or (ii) a group of conditions, at least one of which must be satisfied.

Capturing the media item may further comprise transporting the media item to a returns bin arranged to store media items to be returned to a media issuing authority for destruction of those media items. Where media items are banknotes, the contents of the returns bin may be sent to a central bank that issued that currency.

Multiple returns bins may be provided for terminals that handle multiple currencies.

Currency bins may be in any convenient form, such as cassettes, cartridges, or the like, and may automatically close (and optionally lock) on removal from the validator.

According to a second aspect there is provided a method of establishing a cut-off point for use in evaluating soiling of a media item, the method comprising:

(a) receiving an image of a media item, the image including a plurality of pixels, each pixel having an associated intensity;

(b) creating two sets of pixels, where each pixel in the first set has a higher intensity than each pixel in the second set;

(c) calculating a representative intensity value from the first set and a representative intensity value from the second set;

(d) calculating a ratio of the representative intensity value of the second set to the representative intensity value of the first set;

(e) repeating steps (a) to (d) for a plurality of different media items to generate a plurality of ratios; and (f) establishing a cut-off criterion so that any media item having a ratio satisfying that cut-off criterion will be captured for return instead of being dispensed.

By virtue of this aspect, the same intensity information used for media item recognition and validation can also be used for evaluating a soiling level of the media item.

It should be appreciated that calculating a ratio of the representative intensity value of the second set to the representative intensity value of the first set includes either (i) the representative intensity value of the second set divided by the representative intensity value of the first set, or (ii) the representative intensity value of the first set divided by the representative intensity value of the second set.

The method may comprise the further step of employing a numerical modelling technique to produce a best-fit curve for the plurality of ratios.

The numerical modelling technique may include using an exponential distribution density and using a maximum likelihood rule to estimate a parameter for the exponential distribution density.

The method may comprise the further steps of (f-2) generating a classification curve from the plurality of ratios;

(f-1) storing one or more parameters for producing the generated classification curve; and the step (f) of establishing a cut-off criterion may include establishing a cut-off point on the classification curve so that any media item having a ratio on one side of the cut-off point will be captured for return instead of being dispensed, and any media item having a ratio on the opposite side of the cut-off point will be stored for subsequent dispensing.

According to a third aspect there is provided a method of establishing a cut-off point for use in evaluating the soiling condition of a media item, the method comprising:

(a) receiving an image of a media item, the image including a plurality of pixels, each pixel having an associated intensity;

(b) creating two sets of pixels, where each pixel in the first set has a higher intensity than each pixel in the second set;

(c) calculating a representative intensity value from the first set and a representative intensity value from the second set;

(d) calculating a ratio of the representative intensity value of the second set to the representative intensity value of the first set;

(e) repeating steps (a) to (d) for a plurality of different media items to generate a plurality of ratios;

(f) generating a classification curve from the plurality of ratios;

(g) storing one or more parameters for producing the generated classification curve; and (h) establishing a cut-off point on the classification curve so that any media item having a ratio on one side of that cut-off point will be captured for return instead of being dispensed.

The classification curve parameter(s) and the cut-off point may be provided to a terminal, such as a self-service terminal, to allow that terminal to evaluate whether a media item, such as a banknote, meets a certain standard of cleanliness (or lack of soiling).

If it is ascertained that some captured media items are of sufficiently good quality to be recycled (that is, dispensed to a subsequent customer), then the cut-off point may be adjusted in one direction (for example, downwards) to remove fewer media items from circulation. Similarly, if it is ascertained that some media items are being recycled that are too soiled for use, then the cut-off point may be adjusted in the opposite direction (for example, upwards) to remove a greater number of media items from circulation.

The two sets may be created by: calculating a medium intensity for the image, and assigning each pixel as either light or dark depending on the intensity information for that pixel compared with the medium intensity. The medium intensity may be the mean, the mode, or the median intensity. A pixel may be light if its intensity is greater than the medium intensity, and dark if its intensity is less than the medium intensity, any values equal to the medium intensity may always be set to light, always be set to dark, alternately set to light or dark, or assigned to light or dark according to any convenient algorithm (which includes random assignment).

Calculating a representative intensity value from the first set may be implemented by calculating the mean intensity value for all pixels in that set. A similar step may be performed to calculate a representative intensity value from the second set.

Generating a classification curve from the plurality of ratios may be implemented by using an exponential density distribution function or any other convenient function. An exponential density distribution function is appropriate for use as a classification curve because the probability that a media item will increase its soiling level in the next time period is independent of its current soiling level.

The method may comprise the further step (h-1) of using a bootstrap resampling method to sample randomly from the received images with replacement to ascertain an empirical distribution of the observed points along the classification curve.

The cut-off point may be established based on a lowest preset percentage of points along the classification curve, such as one percent, two percent, five percent, ten percent, or the like.

According to a fourth aspect there is provided a media item validator comprising an illumination source for illuminating a media item, a detector for detecting a pixel intensity at each of a plurality of pixels, and a controller adapted to (i) create two sets of pixels, where each pixel in the first set has a higher intensity than each pixel in the second set, (ii) calculate a representative intensity value from the first set and a representative intensity value from the second set, (iii) calculate a soiling value from the ratio of the representative intensity value of the second set to the representative intensity value of the first set, and (iv) capture the media item if the soiling value fulfils a capture criterion.

The media validator may include a memory operable to store banknote validation templates, each banknote validation template including one or more pre-stored parameters (such as a cut-off value) for use in ascertaining if the capture criterion is fulfilled.

The media validator may include a communications interface for communicating with a controller module within a self-service terminal. The media validator may use the communications interface to communicate information about the number of media items received, the number of media items validated, the number of media items captured for return to a media item issuing authority, and the like. The communications interface may also be used to communicate state of health information, logs, tallies, and the like.

According to a fifth aspect there is provided a computer program comprising program instructions for implementing all of the steps of the first aspect.

According to a sixth aspect there is provided a computer program comprising program instructions for implementing all of the steps of the second aspect.

According to a seventh aspect there is provided a computer program comprising program instructions for implementing all of the steps of the third aspect.

Any of these computer programs may be embodied on a record medium, conveyed on an electrical carrier signal, or stored in a computer memory.

According to an eighth aspect there is provided a self-service terminal incorporating the media item validator of the fourth aspect. The self-service terminal may be an ATM, a self-checkout terminal, or a terminal used in the financial, postal, retail, gaming, healthcare, airline, hospitality, or vehicle rental industries.

These and other aspects will be apparent from the following specific description, given by way of example, with reference to the accompanying drawings.

DETAILED DESCRIPTION

Figure 1:
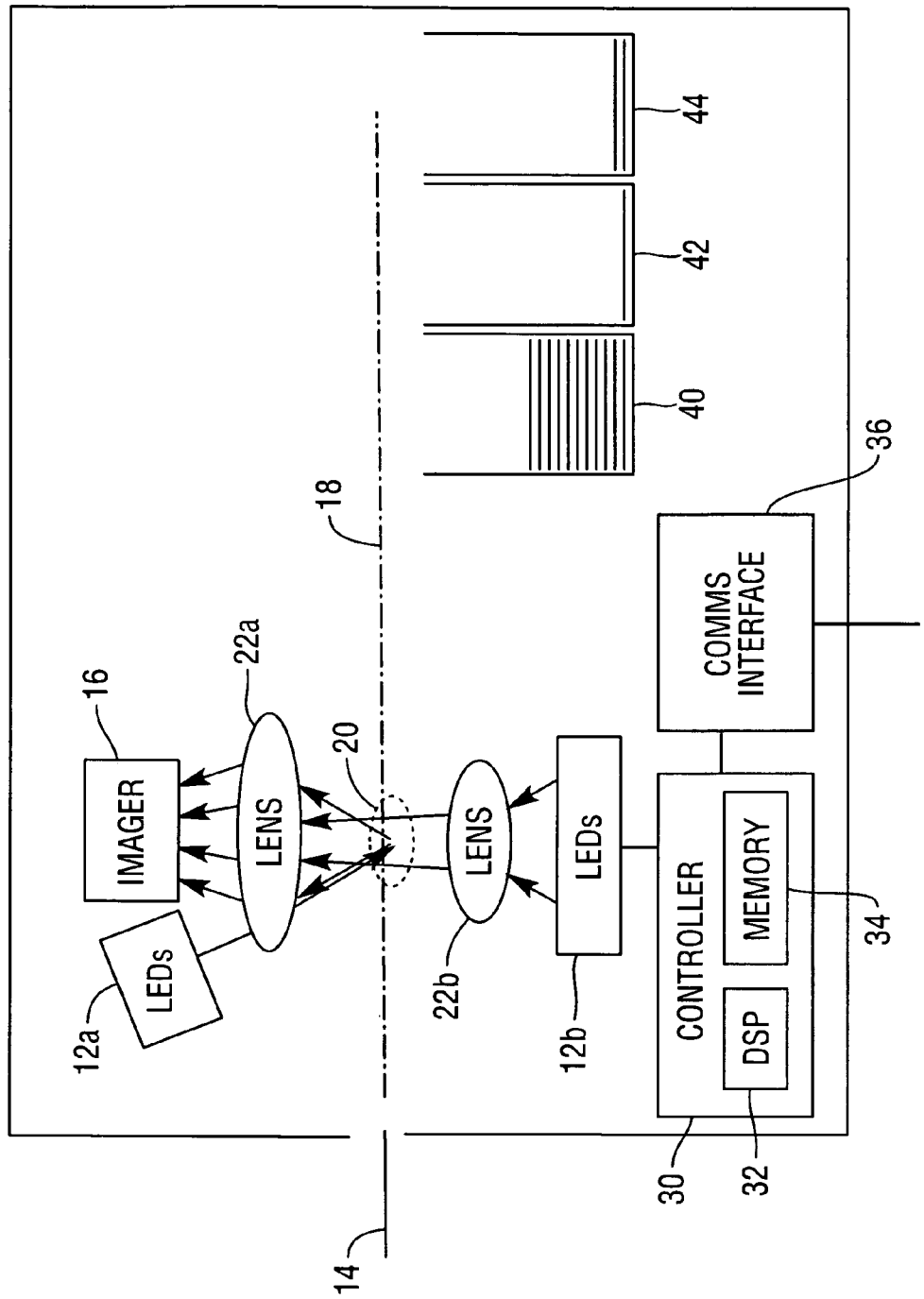
FIG. 1 is a block diagram of a media validator according to one embodiment of the present invention.

Reference is first made to FIG. 1, which is a simplified block diagram of a media validator 10, in the form of a banknote validator. The banknote validator 10 (sometimes referred to as a bill validator, or just a "BV") comprises an illumination source 12 for illuminating a media item 14 (in this embodiment a banknote), and a detector 16 including a plurality of pixels, each operative to detect a pixel intensity based on transmission of light from the illumination source 12 through the banknote 14. The illumination source 12 comprises LEDs located above (LEDs 12a) and below (LEDs 12b) a transport path 18, so that when the banknote 14 is located at an examination area 20, lenses 22 above and below the transport path 18 direct light transmitted through and reflected from the banknote 14 to the detector 16.

The banknote validator 10 further comprises a controller 30 adapted to implement (i) a banknote recognition process (to ascertain the type of banknote being presented), (ii) a banknote validation process (to ascertain if the banknote presented is a valid banknote, a counterfeit banknote, or a suspect banknote), and (iii) a banknote soiling evaluation process (as will be described in more detail below).

Banknote recognition and validation processes are well known in the art, and are implemented by banknote validators available from NCR Corporation, 1700 S. Patterson Blvd, Dayton, Ohio, 45479, USA. For this reason, these processes will not be described in detail herein.

The controller 30 comprises a processor 32 (in the form of a digital signal processor (DSP)) and an associated memory 34. The banknote validator 10 also includes a communications interface 36 for communicating with a personal computer (PC) (not shown) or a controlling module (such as is used in an ATM to control modules mounted within the ATM, such as a card reader module, a cash dispense module, and the like).

The banknote validator 10 may be initially coupled to a high performance PC to enable templates and parameters to be generated for various types of banknotes. Once these templates and parameters have been generated, the banknote validator 10 may be disconnected from the PC and incorporated into a self-service terminal (such as an ATM). However, the banknote validator 10 may be used to generate the parameters, if desired.

The validator 10 also includes a currency recycling bin 40 for storing banknotes to be dispensed to subsequent customers; a counterfeit currency bin 42 for storing counterfeit and/or suspect banknotes (which may be stored in a separate bin); and a returns bin 44 for storing banknotes that are too soiled to be dispensed.

Automated Parameter Generation

Figure 2:
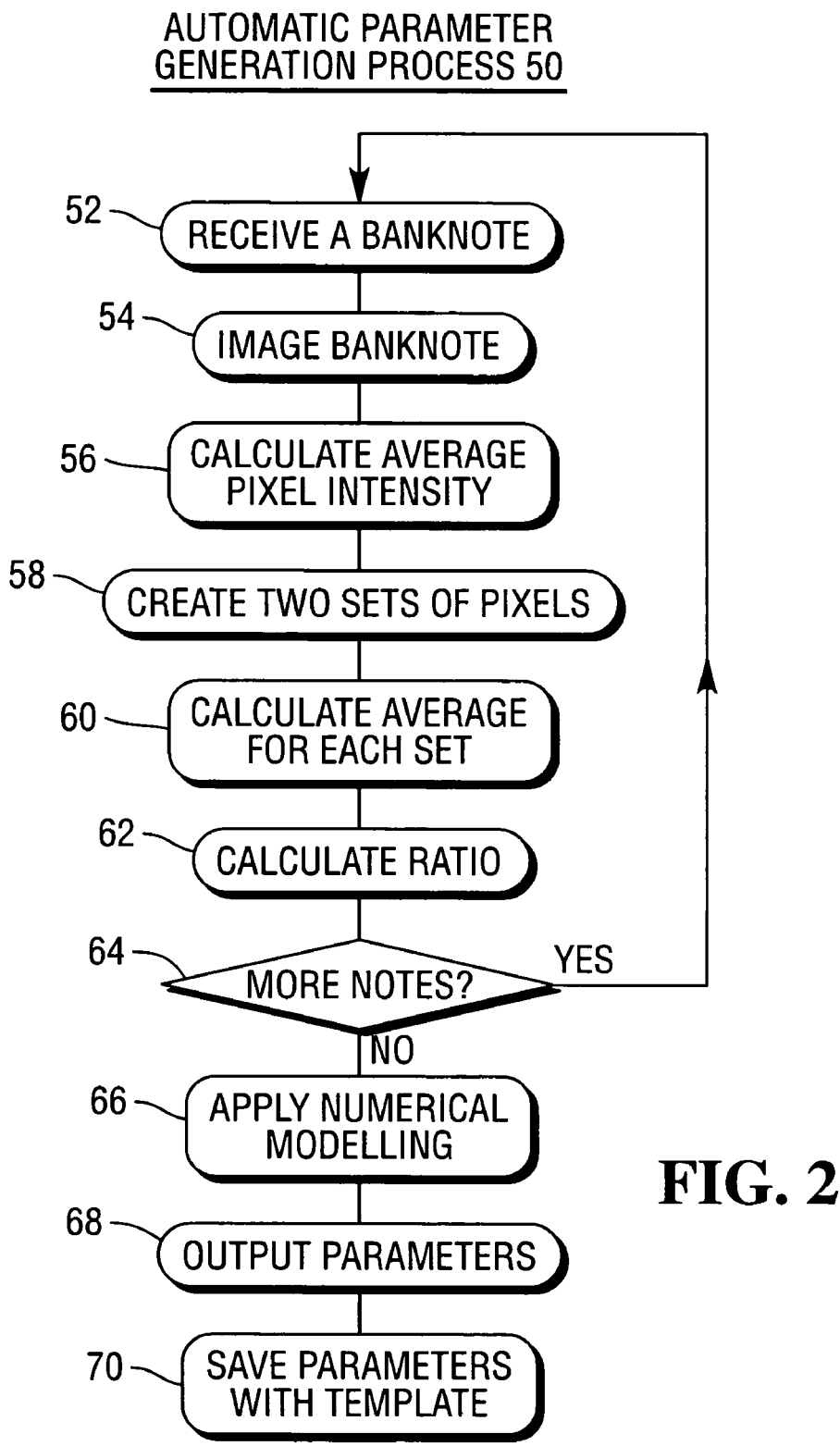
FIG. 2 is a flowchart illustrating steps involved in a process for establishing a cut-off point for use by the media validator of FIG. 1 in evaluating soiling of media items.

A process for automatically generating parameters for banknote soiling evaluation will now be described with reference to FIG. 2, which is a flowchart illustrating the steps involved in the automatic parameter generation process 50.

Initially, an operator collects a training set of the same type (currency, denomination, series, and orientation) of banknotes, and then feeds in these banknotes to the validator 10 one banknote at a time (or as a bunch of banknotes, if the validator 10 can receive bunched banknotes). Each banknote 14 is received by the validator 10 (step 52). The training set may be any convenient size. In this embodiment, the training set comprises one hundred banknotes. The training set comprises banknotes representative of those commonly in circulation.

As each banknote is fed in, it is imaged at the examination area 20 (step 54). This imaging step involves the detector 16 producing a two-dimensional array of pixels corresponding to the banknote dimensions, each pixel having an associated intensity based on the intensity of light transmitted through the banknote 14 and detected by a detector element corresponding to that pixel.

The controller 30 then receives the two-dimensional array of pixels and calculates a medium intensity, which in this embodiment is the average pixel intensity (step 56).

The controller 30 then creates two pixel sets (step 58). This is implemented by comparing the intensity of each pixel with the average pixel intensity, and assigning any pixel having a higher intensity than the average pixel intensity to a first set, and any pixel having a lower (or equal) intensity than the average pixel intensity to a second set.

The controller 30 then calculates the average pixel intensity for each of the first and seconds sets (step 60), and then calculates the ratio of the average pixel intensity for the second set to the average pixel intensity of the first set (step 62) and stores the resulting ratio as part of a group of ratios for that training set. This ratio is always less than one because the intensities of the pixels in the first set are always higher than the intensities of pixels in the second set.

The controller 30 then ascertains if there are any more banknotes to be imaged from the training set (step 64). If there are still banknotes to be imaged, then the process repeats from step 52. If there are no more banknotes to be imaged, then the controller 30 applies a numerical modelling technique to the group of ratios (step 66).

The particular numerical modelling technique used in this embodiment involves an exponential density distribution equation, as shown below in equation (1)

$$\mathrm{Exp}(x \mid \mu) = \frac{1}{\mu} e^{-\frac{x}{\mu}} \qquad (1)$$

The value of scale parameter µ (referred to herein for convenience as the "scale") can be estimated using the maximum likelihood rule. The scale ("μ") is the mean (or expected value) of the exponentially distributed random variable x defined by equation (1).

To generate the classification curve and establish the cut-off criterion, the empirical distribution of the training set has to be estimated, where each point is assumed to be drawn from the underlying distribution from equation (1) independently and identically. In this embodiment, this involves using an empirical bootstrap resampling method. It constructs a large number (M, for example M may be larger than one thousand) of resamples of the training set, each of which is obtained by random sampling with replacement from the original dataset and is of equal size (N) to the original set. Each of these M sets is then fitted with an exponential distribution model by maximum likelihood, yielding M estimated scale parameters $\hat{\mu}_N^i$, i=1, ..., M. For each of these M models the controller 30 then randomly selects an extra N+1$^{th}$ test point, and calculates the test statistic $\lambda_{crit}^i$, i=1, ..., M by computing $Exp(x_{N+1}\|\hat{\mu}_N^i) = \lambda_{crit}^i$ according to equation (1). The controller 30 then orders $\lambda_{crit}^i$, i=1, ..., M into ascending values. The critical value $\lambda_\alpha$ can be defined to reject the null hypothesis that a test point is drawn from the same underlying exponential distribution as the training set at the desired significance level α if $\lambda \leq \lambda_\alpha$, where $\lambda_\alpha$ is the jth smallest value of $\lambda_{crit}^i$, and j=floor[α(M+1)]. The function floor[x] is used to round x to the nearest integer less than or equal to x. The significance level α controls the theoretical percentage of banknotes that will be captured, assuming that the training set reflects the normal circulated population of banknotes. For example α=0.05 means that theoretically 5% of the notes in circulation will be captured as being too soiled for recycling.

Optionally, all values of $\lambda_{crit}^i$, i=1, ..., M can be stored separately in an offline database, or in memory within, or accessible by, the validator 10 if desired. This may be useful for future updates, as will be described in more detail below.

What this means is that the values of ratios from the group of ratios are fitted to a curve (an exponential curve) according to equation (1), and the value of μ (scale) required for such a fit is estimated. The actual position of each ratio along this curve is then plotted so that the distribution of ratios along this curve is obtained. This enables the controller 30 to select a cut-off point ($\lambda_\alpha$) such that if the calculation of equation (1) for any particular ratio yields a value lower than the cut-off point, then the banknote that produced that ratio should be rejected as being too soiled for continued use. The cut-off point ($\lambda_\alpha$) is generated based on a percentage of banknotes to be rejected from the training set (such as 5%).

The controller then outputs these calculated parameters (the scale (μ) and the cut-off point ($\lambda_\alpha$)) (step 68) and saves them in the memory 34 together with the validation template for that type of banknote (step 70).

Automated Soiling Evaluation

Figure 3:
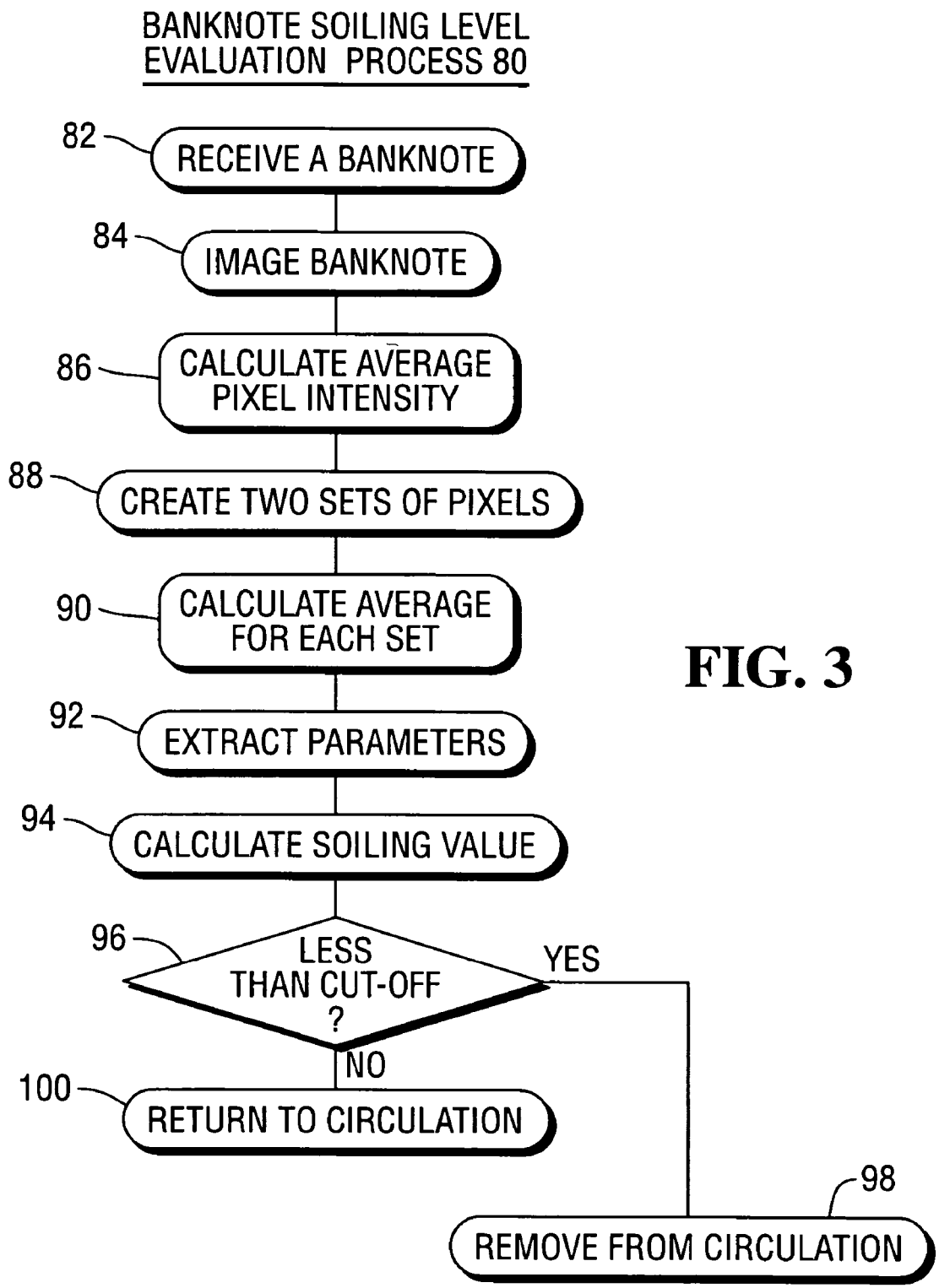
FIG. 3 is a flowchart illustrating steps implemented by the media validator of FIG. 1 in evaluating soiling of media items using the cut-off point established by the process of FIG. 2.

Once the parameters have been calculated and saved to memory, the banknote validator 10 can be used to evaluate the soiling level of individual banknotes inserted therein. A process for evaluating the soiling level of banknotes 14 using the scale and cut-off point derived by the automated parameter generation process 50 will now be described with reference to FIG. 3. FIG. 3 is a flowchart illustrating the banknote soiling level evaluation process 80.

The first step is to feed in a banknote 14, which is received by the validator 10 (step 82), and then imaged at the examination area 20 (step 84). This imaging step involves the detector 16 producing a two-dimensional array of pixels corresponding to the banknote dimensions, each pixel having an associated intensity based on the intensity of transmitted light detected by that pixel.

The controller 30 then receives the two-dimensional array of pixels and calculates a medium intensity, in this embodiment the average pixel intensity (step 86) for the array.

The controller 30 then creates two pixel sets (step 88). This is implemented by comparing the intensity of each pixel with the average pixel intensity and assigning any pixel having a higher intensity than the average pixel intensity to a first set, and any pixel having a lower (or equal) intensity than the average pixel intensity to a second set.

The controller 30 then calculates the average pixel intensity for each of the first and seconds sets (step 90), and then calculates the ratio of the average pixel intensity for the second set to the average pixel intensity of the first set (step 92) (referred to as the "evaluation ratio"). Up to this point, the process 80 is identical to process 50 (which was used to derive parameters from the training set of banknotes).

In parallel with this processing, however, the banknote validator 10 identifies the type of banknote (currency, denomination, series, and orientation) using a recognition process, and then validates this banknote 14 against a validation template for that banknote type, using a validation process. As a result, at this point the controller 30 knows the type of banknote being examined.

The controller 30 accesses the validation template for the banknote being examined, and extracts the two parameters (the scale and the cut-off point) from that template (step 92). These two parameters were stored with that validation template in step 70 of the automatic parameter generation process 50 above.

The controller 30 then uses one of the extracted parameters (the scale (μ)) and the calculated evaluation ratio to compute a soiling value using equation (1) (step 94).

The controller 30 compares this soiling value to the other extracted parameter (the cut-off point ($\lambda_\alpha$)) (step 96). If the soiling value is less than the cut-off point, then the validator 10 removes the banknote 14 from circulation (step 98) by conveying the banknote 14 to the returns bin 44 within the validator 10, which stores banknotes to be returned to a currency issuing bank for that currency.

If the soiling value is greater than or equal to the cut-off point ($\lambda_\alpha$) (step 96), then the validator 10 returns the banknote 14 to circulation (step 100) by conveying the banknote 14 to the currency recycling bin 40 within the validator 10.

Of course, if the banknote 14 is not validated as genuine, then it is captured as either a suspect banknote or a counterfeit banknote, irrespective of the soiling level of the banknote 14.

It will now be appreciated that the soiling condition of a banknote, or other media item (such as a cheque, giro, certificate, ticket, or the like), can be evaluated using a calculation based on two simple parameters. If too many banknotes of adequate condition are being removed from circulation, then the value of the cut-off point can be decreased; similarly, if too many banknotes of inadequate condition are being returned to circulation, then the value of the cut-off point can be increased. Changing the cut-off point does not require any retraining or any additional parameters to be generated.

To ensure that a controlled percentage of banknotes in circulation will be captured by the new level of cut-off point, instead of just estimating (or guessing) a new cut-off point, the new value of a new cut-off point can be derived from the stored values for $\lambda_{crit}^i$ using the new desired significance level α. Thus, if the significance level α was previously 0.03 (3%), then the new desired significance level α could be selected as 0.04 (4%). This would ensure that an additional 1% of banknotes from the training set would be captured.

This embodiment provides a very quick and flexible method for evaluating the soiling level of a banknote. It even allows different validators to have different cut-off points depending on where the validators are geographically located (rural areas may tolerate banknotes in poorer condition than urban areas).

The validator may be incorporated into an ATM, a check-in and/or check-out terminal, a terminal used in the hotel, car rental, gaming, postal, healthcare, or airline industry, or the like.

It should now be appreciated that the above embodiment provides an automated, reliable process for identifying media items that should be returned to an issuer (that is, removed from circulation) because of excessive soiling. The process is flexible because the parameters can be changed to adjust the soiling level that is deemed to be satisfactory. The process only requires image information, not magnetic information, or the like. Furthermore, it can be used with visible light from LEDs, such as green light. The process only requires a small amount of memory and does not cause any processing burdens for its implementation. The process is fast, both in terms of parameter generation (typically of the order of a few seconds once media item image data has been collected) and media item evaluation (typically microseconds per type of media item).

Various modifications may be made to the above described embodiment within the scope of the invention, for example, in other embodiments the validator may validate media items other than banknotes, for example, cheques, giros, certificates, tickets, or the like.

In other embodiments, the evaluation ratio calculated in step 92 may be used without any further calculation to ascertain the soiling level of the banknote. In such embodiments, only one parameter would need to be stored with the validation template, namely, an evaluation ratio critical value, such that if the calculated evaluation ratio is greater than (or optionally greater than or equal to) the critical value, then the media item should be captured for return to a media issuing authority responsible for issuing that media item, otherwise the media item would be recycled.

In other embodiments, different numerical methods may be used in step 66 than that described. Any convenient numerical method may be used, although the inventors have verified that curve fitting based on an exponential function has provided accurate results.

In other embodiments, additional checks may be performed to ascertain if the media item has tears, perforations, creases, folds, or other defects that would render the media item unsuitable for continued use (that is, recycling to a subsequent customer). These checks may be performed by the validator in parallel with ascertaining the soiling level. For example, an area of pixels all having a very high intensity may indicate that there is a perforation at that area because the transmitted light was not attenuated by the media item. However, for polymer substrates, this may be due to transmission through the transparent substrate.

In other embodiments, a personal computer (PC) may be coupled to the validator for receiving images from the validator and operating on those images to derive parameters for use with media validation templates. Thus, a PC may be used to derive the parameters rather than the validator deriving the parameters.

The steps of the methods described herein may be carried out in any suitable order, or simultaneously where appropriate. The methods described herein, or some steps thereof, may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A method for evaluating a soiling level of a media item, the method comprising:
   receiving an image of a media item including a plurality of pixels, each pixel having an associated pixel intensity;
   calculating a medium pixel intensity value from the plurality of pixels;
   comparing pixel intensity of each pixel of the plurality of pixels with the medium pixel intensity value;
   assigning any pixel of the plurality of pixels having a pixel intensity higher than the medium pixel intensity value to a first set of pixels;
   assigning any pixel of the plurality of pixels having a pixel intensity lower than the medium pixel intensity value to a second set of pixels;
   calculating a first representative pixel intensity value from the first set of pixels and a second representative pixel intensity value from the second set of pixels;
   calculating a soiling value from the ratio of the second representative pixel intensity value of the second set of pixels to the first representative pixel intensity value of the first set pixels; and
   capturing the media item if the soiling value fulfils a capture criterion.

2. A method according to claim 1, wherein capturing the media item further comprises transporting the media item to a returns bin for storing media items to be returned to a media issuing authority for destruction of those media items.

3. A method according to claim 1, wherein capturing the media item further comprises extracting one or more parameters from a template for the media item, and using the extracted parameters to ascertain if the soiling value fulfils the capture criterion.

4. A method according to claim 1, wherein calculating a soiling value further comprises performing a mathematical function on the ratio of the second representative pixel intensity value of the second set of pixels to the first representative pixel intensity value of the first set of pixels, using a pre-stored parameter associated with the media item.

5. A method according to claim 1, wherein the medium pixel intensity value calculated from the plurality of pixels comprises an average pixel intensity value calculated from the plurality of pixels.

6. A method according to claim 1, wherein (i) the first representative pixel intensity value calculated from the first set of pixels comprises an average pixel intensity value calculated from the first set of pixels, and (ii) the second representative pixel intensity value calculated from the second set of pixels comprises an average pixel intensity value calculated from the second set of pixels.

7. A method according to claim 1, wherein (i) the medium pixel intensity value calculated from the plurality of pixels comprises an average pixel intensity value calculated from the plurality of pixels, (ii) the first representative pixel intensity value calculated from the first set of pixels comprises an average pixel intensity value calculated from the first set of pixels, and (iii) the second representative pixel intensity value calculated from the second set of pixels comprises an average pixel intensity value calculated from the second set of pixels.

8. A method according to claim 1, further comprising assigning any pixel of the plurality of pixels having a pixel intensity equal to the medium pixel intensity value to the second set of pixels.

9. A computer program on a non-transitory computer-readable medium comprising program instructions for implementing all of the steps of claim 1.

10. A media item validator comprising:
an illumination source for illuminating a media item,
a detector for detecting a pixel intensity at each of a plurality of pixels, and
a controller adapted to:
(i) calculate a medium pixel intensity value from the plurality of pixels,
(ii) compare pixel intensity of each pixel of the plurality of pixels with the medium pixel intensity value,
(iii) assign any pixel of the plurality of pixels having a pixel intensity higher than the medium pixel intensity value to a first set of pixels,
(iv) assign any pixel of the plurality of pixels having a pixel intensity lower than the medium pixel intensity value to a second set of pixels,
(v) calculate a first representativeib xel intensity value from the first set of pixels and a second representative pixel intensity value from the second set of pixels,
(vi) calculate a soiling value from the ratio of the second representative pixel intensity value of the second set of pixels to the first representative pixel intensity value of the first set of pixels, and
(vii) capture the media item if the soiling value fulfils a capture criterion.

11. A media validator according to claim 10, wherein the media validator includes a memory operable to store banknote validation templates, each banknote validation template including a cut-off value for use in ascertaining if the capture criterion is fulfilled.

12. A media validator according to claim 10, wherein the media validator includes a communications interface for communicating with a controller module within a self-service terminal.

13. A media item validator according to claim 10, wherein the medium pixel intensity value calculated from the plurality of pixels comprises an average pixel intensity value calculated from the plurality of pixels.

14. A media item validator according to claim 10, wherein (i) the first representative pixel intensity value calculated from the first set of pixels comprises an average pixel intensity value calculated from the first set of pixels, and (ii) the second representative pixel intensity value calculated from the second set of pixels comprises an average pixel intensity value calculated from the second set of pixels.

15. A method for evaluating a soiling level of a media item, the method comprising:
(a) receiving an image of a media item including a plurality of pixels, each pixel having an associated intensity;
(b) creating two sets of pixels, where each pixel in the first set has a higher intensity than each pixel in the second set;
(c) calculating a representative intensity value from the first set and a representative intensity value from the second set, wherein calculating a representative intensity value from the first set further comprises calculating the mean intensity value for all pixels in the first set, and calculating a representative intensity value from the second set further comprises calculating the mean intensity value for all pixels in the second set;
(d) calculating a soiling value from the ratio of the representative intensity value of the second set to the representative intensity value of the first set; and
(e) capturing the media item if the soiling value fulfils a capture criterion.

16. A method according to claim 15, wherein capturing the media item further comprises transporting the media item to a returns bin for storing media items to be returned to a media issuing authority for destruction of those media items.

17. A method according to claim 15, wherein capturing the media item further comprises extracting one or more parameters from a template for the media item, and using the extracted parameters to ascertain if the soiling value fulfils the capture criterion.

18. A method according to claim 15, wherein creating two sets of pixels further comprises the sub-steps of:
calculating a medium intensity for the image, and
assigning each pixel as either light or dark depending on intensity information for the each pixel compared with the medium intensity.

19. A method according to claim 15, wherein calculating a soiling value further comprises performing a mathematical function on the ratio of the representative intensity value of the second set to the representative intensity value of the first set, using a pre-stored parameter associated with the media item.

20. A computer program on a non-transitory computer-readable medium comprising program instructions for implementing all of the steps of claim 15.

* * * * *